US012596186B2

(12) United States Patent
Bariant et al.

(10) Patent No.: US 12,596,186 B2
(45) Date of Patent: Apr. 7, 2026

(54) METHOD FOR OPERATING AN ULTRASONIC SENSOR, COMPUTER PROGRAM PRODUCT, ULTRASONIC SENSOR SYSTEM AND VEHICLE

(71) Applicant: VALEO SCHALTER UND SENSOREN GMBH, Bietigheim-Bissingen (DE)

(72) Inventors: Jean Francois Bariant, Bietigheim-Bissingen (DE); Radhakrishna Chivukula, Bietigheim-Bissingen (DE); Anto Joys Yesuadimai Michael, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 272 days.

(21) Appl. No.: 18/567,910

(22) PCT Filed: May 30, 2022

(86) PCT No.: PCT/EP2022/064545
§ 371 (c)(1),
(2) Date: Dec. 7, 2023

(87) PCT Pub. No.: WO2022/258411
PCT Pub. Date: Dec. 15, 2022

(65) Prior Publication Data
US 2024/0264295 A1     Aug. 8, 2024

(30) Foreign Application Priority Data
Jun. 10, 2021     (DE) ..................... 10 2021 114 988.6

(51) Int. Cl.
*G01S 15/931* (2020.01)
*G01S 7/52* (2006.01)

(52) U.S. Cl.
CPC ........ *G01S 7/52006* (2013.01); *G01S 15/931* (2013.01)

(58) Field of Classification Search
CPC .... G01H 11/00; G01H 3/005; G01S 7/52006; G01S 15/931
See application file for complete search history.

(56) References Cited

U.S. PATENT DOCUMENTS

| 5,585,546 A | 12/1996 | Gururaja et al. | |
| 5,710,798 A * | 1/1998 | Campana, Jr. ........... | H04L 1/02 370/506 |

(Continued)

FOREIGN PATENT DOCUMENTS

| CN | 110118612 A | 8/2019 |
| DE | 102009039083 A1 | 3/2011 |

(Continued)

OTHER PUBLICATIONS

International Search Report and Written Opinion in corresponding International Application No. PCT/EP2022/064545, dated Sep. 9, 2022 (13 pages).

(Continued)

*Primary Examiner* — Daniel L Murphy
*Assistant Examiner* — Amie M Ndure
(74) *Attorney, Agent, or Firm* — Osha Bergman Watanabe & Burton LLP

(57)     ABSTRACT

A method for operating an ultrasonic sensor is disclosed. The ultrasonic sensor includes a membrane and an exciter element for exciting the membrane and for detecting a vibration of the membrane. The method includes obtaining calibration data from a storage unit storing the calibration (Continued)

| determined sensitivity (Hz) | electric current modification (mA) | gain modification (dB) |
|---|---|---|
| 500 | 400 | 3 |
| 600 | 300 | 2 |
| 700 | 200 | 2 |
| 800 | 100 | 2 |
| 900 | 0 | 1 |
| 1000 | 0 | 1 |
| 1100 | 0 | -1 |
| 1200 | -100 | -2 |
| 1300 | -200 | -2 |
| 1400 | -300 | -2 |
| 1500 | -400 | -3 | data. The calibration data includes information about a first frequency response of the ultrasonic sensor in a sending direction depending on a membrane excitation frequency at different membrane temperatures and information about a second frequency response of the ultrasonic sensor in a receiving direction depending on a membrane vibration frequency at different temperatures. The method also includes determining a current membrane temperature, determining a sensitivity of the ultrasonic sensor, and controlling an electric current provided to the exciter element and a gain of the ultrasonic sensor based on a difference between the determined sensitivity and a prestored sensitivity.

15 Claims, 10 Drawing Sheets

(56) References Cited

U.S. PATENT DOCUMENTS

| | | | | | |
|---|---|---|---|---|---|
| 5,717,725 | A | * | 2/1998 | Campana, Jr. | H04L 1/004 |
| | | | | | 714/776 |
| 5,745,532 | A | * | 4/1998 | Campana, Jr. | H04L 7/042 |
| | | | | | 455/504 |
| 5,991,234 | A | * | 11/1999 | Sejalon | B06B 1/0246 |
| | | | | | 367/13 |
| 6,272,190 | B1 | * | 8/2001 | Campana, Jr. | H04B 7/10 |
| | | | | | 375/347 |
| 6,295,873 | B1 | * | 10/2001 | Condreva | G01N 29/024 |
| | | | | | 73/61.79 |
| 10,448,873 | B2 | | 10/2019 | Böhm et al. | |
| 11,573,319 | B2 | * | 2/2023 | Haag | G01S 15/931 |
| 12,334,943 | B2 | * | 6/2025 | Jefferts | H01P 3/122 |
| 2004/0064280 | A1 | | 4/2004 | Seip et al. | |
| 2007/0157728 | A1 | | 7/2007 | Endou | |
| 2019/0354238 | A1 | * | 11/2019 | Akhbari | G06F 3/043 |
| 2023/0091607 | A1 | * | 3/2023 | Wang | G10L 25/21 |
| | | | | | 704/500 |

FOREIGN PATENT DOCUMENTS

| | | | |
|---|---|---|---|
| DE | 102012002979 | A1 | 8/2013 |
| DE | 102012215493 | A1 | 3/2014 |
| DE | 112016005377 | T5 | 8/2018 |
| DE | 102019217709 | A1 | 5/2021 |

OTHER PUBLICATIONS

German Search Report in corresponding German Application No. 10 2021 114 988.6, dated Feb. 17, 2022 (5 pages).

Office Action issued in corresponding Korean Application No. 10-2024-7001051, dated Jan. 13, 2026. (20 pages).

* cited by examiner

| determined sensitivity (Hz) | electric current modification (mA) | gain modification (dB) |
|---|---|---|
| 500 | 400 | 3 |
| 600 | 300 | 2 |
| 700 | 200 | 2 |
| 800 | 100 | 2 |
| 900 | 0 | 1 |
| 1000 | 0 | 1 |
| 1100 | 0 | -1 |
| 1200 | -100 | -2 |
| 1300 | -200 | -2 |
| 1400 | -300 | -2 |
| 1500 | -400 | -3 |

FIG. 9

METHOD FOR OPERATING AN ULTRASONIC SENSOR, COMPUTER PROGRAM PRODUCT, ULTRASONIC SENSOR SYSTEM AND VEHICLE

The invention relates to a method for operating an ultrasonic sensor, a computer program product, an ultrasonic sensor system and a vehicle with such an ultrasonic sensor system.

Ultrasonic sensors can be used in vehicles to determine distances between the vehicle and objects located in the vehicle's surroundings. Such ultrasonic sensors can comprise a housing and an ultrasonic membrane disposed in an opening of the housing. The ultrasonic sensors can be used to measure a distance to an object in the vehicle environment according to the pulse-echo method. In this process, the ultrasonic membrane, excited by an exciter element attached to it, emits energy in the form of an ultrasonic signal. The exciter element then detects vibrations of the ultrasonic membrane, which result from an echo signal returning from the vehicle environment. The distance to the object is determined based on the signal propagation time. Such measurements are used, for example, by a parking assistance system of the motor vehicle. It is known that temperature can influence the sensitivity of ultrasonic sensors.

DE 10 2012 002979 A1 shows an ultrasonic sensor according to the above. A temperature dependent oscillator is used as the exciter element to compensate for the signal propagation time depending on the surrounding temperature of the ultrasonic sensor.

In DE 10 2009 039 083 A1, the surrounding temperature of the ultrasonic sensor is determined by observing the ultrasonic vibrations of the membrane and comparing it with reference values.

The ultrasonic sensor described in DE 10 2012 215 493 A1 includes a temperature sensor. Different values for a threshold above which an echo signal is recognized are set for different temperature values measured by the temperature sensor.

In US 2007/0157728 A1, a temperature compensation is based on the surrounding temperature.

It is one objective of the present invention to improve the method for operating an ultrasonic sensor.

According to a first aspect, a method for operating an ultrasonic sensor, in particular for operating an ultrasonic sensor of a vehicle, is provided. The ultrasonic sensor comprises a membrane and an exciter element for exciting the membrane and/or for detecting a vibration of the membrane. The method comprises:

obtaining calibration data from a storage unit storing the calibration data, the calibration data comprising information about a first frequency response of the ultrasonic sensor, in particular of the membrane, in a sending direction depending on a membrane excitation frequency at different membrane temperatures and information about a second frequency response of the ultrasonic sensor, in particular of the membrane, in a receiving direction depending on a membrane vibration frequency at different membrane temperatures;

determining a current temperature of the membrane;

determining a sensitivity (determined sensitivity) of the ultrasonic sensor using the first frequency response at the current membrane temperature and the second frequency response at the current membrane temperature; and controlling an electric current provided to the exciter element and/or a gain of the ultrasonic sensor based on a difference between the determined sensitivity and a prestored sensitivity.

Controlling the electric current provided to the exciter element and/or the gain of the ultrasonic sensor allows adjusting the sensitivity of the ultrasonic sensor for the given signal path. In particular, the sensitivity can be modified to come close to or reach the prestored sensitivity, which may be a target sensitivity. Advantageously, the sensitivity can be adjusted in a temperature-dependent manner, thereby increasing the accuracy of the sensitivity adjustment. The temperature dependency of the transfer function in a sending direction and/or the temperature dependency of the transfer function in a receiving direction can be respectively compensated. A robust temperature compensation is achieved over the whole membrane temperature spectrum.

The ultrasonic sensor can be used in vehicles to determine distances between the vehicle and objects located in the vehicle's surroundings. The vehicle may be embodied as a passenger vehicle, such as a car, truck, bus, train, plane or the like. The ultrasonic sensor can be part of a parking assistance system of the motor vehicle.

The ultrasonic sensor may comprise a housing and an ultrasonic membrane (also referred to as "membrane") disposed in an opening of the housing. The ultrasonic sensor can be used to measure a distance to an object in the vehicle environment according to the pulse-echo method. In this process, the ultrasonic membrane, excited by the exciter element attached to it, emits energy in the form of an ultrasonic signal. The exciter element then detects vibrations of the ultrasonic membrane, which are from an echo signal returning from an object in the vehicle environment. The distance to the object is determined on the basis of the signal propagation time.

The temperature of the membrane (also referred to as "membrane temperature") changes the membrane's characteristics and may hence influence the sensitivity of the ultrasonic sensor. Expressed differently, the transfer function of the ultrasonic sensor, which is expressed as the gain over the frequency, changes depending on temperature.

To calibrate the ultrasonic sensor, the temperature of the membrane is determined. The temperature of the membrane may be determined by calculations, in particular without using a temperature sensor directly attached to the membrane. The temperature of the membrane is a temperature which is specific to the membrane and which in particular does not correspond to an ambient temperature, a room temperature, a temperature of the surroundings of the ultrasonic sensor or the like. Determining the exact temperature of the membrane allows a better compensation for the temperature dependency of the characteristics of the membrane. Advantageously, the temperature dependency of the sensitivity can be compensated.

The expression "current temperature" designates a true or real temperature of the membrane at a particular point in time. The current temperature does not need to be continuously determined. Rather, it may be determined at predetermined time intervals, for example every minute, every few minutes, or the like.

The steps of obtaining calibration data, determining a current temperature, determining the determined sensitivity and/or controlling the electric current provided to the exciter element and/or the gain of the ultrasonic sensor are preferably part of a calibration process (calibration phase) of the ultrasonic sensor, which is performed prior to using the ultrasonic sensor in an operation process (operation phase) thereof.

The calibration data may be prestored data stored in the storage unit. The information about the first frequency may be stored as different curves or tables for each temperature. The information about the second frequency may be stored as different curves or tables for each temperature. Preferably, the calibration data is determined individually for each ultrasonic sensor. The calibration data may be specific to the corresponding ultrasonic sensor and/or specific to a signal path (described further below). This increases the accuracy with which the sensitivity can be determined and adjusted.

The first frequency response of the ultrasonic sensor in the sending direction as a function of (depending on) the membrane excitation frequency can be indicative of how the transfer function of the ultrasonic sensor varies depending on frequency and temperature in a sending direction. In the sending direction, the transfer function can be indicative of how an output of the membrane varies depending on the excitation frequency from the exciter element. The first frequency response can be expressed in decibels (dB) or dimensionless, if it is divided by a reference frequency response at room temperature, as will be described below. The frequency can be expressed in Hertz or Kilohertz (Hz or kHz) and the temperature may be expressed in degrees Celsius (° C.). The sending direction is the direction in which the ultrasonic sensor sends out ultrasonic signals.

The second frequency response of the ultrasonic sensor in the receiving direction as a function of (depending on) the membrane excitation frequency can be indicative of how the transfer function of the ultrasonic sensor varies depending on frequency and temperature in a receiving direction. In the receiving direction, the transfer function can be indicative of how a signal received at the exciter element varies depending on the vibration frequency of the membrane. The second frequency response can be expressed in decibels (dB) or dimensionless, if it is divided by a reference frequency response at room temperature, as will be described below. The frequency can be expressed in Hertz or Kilohertz (Hz or kHz) and the temperature may be expressed in degrees Celsius (° C.). The receiving direction is the direction in which the ultrasonic sensor receives ultrasonic signals, in particular echoes from the ultrasonic signal previously sent out by the membrane and reflected back by an object.

The first frequency response at the current membrane temperature preferably includes a frequency dependent first frequency response (stored for example as or in a curve or a table in the calibration data) corresponding to the determined current membrane temperature. The second frequency response at the current membrane temperature preferably includes a frequency dependent second frequency response (stored for example as or in a curve or a table in the calibration data) corresponding to the determined current membrane temperature.

The sensitivity of the ultrasonic sensor in particular refers to an integral of a difference between the transfer function in the sending direction (expressed by the first frequency response) and the transfer function in the receiving direction (expressed by the second frequency response) multiplied by a predetermined weighting factor, the integral being performed over the entire (frequency) bandwidth or over a (frequency) bandwidth of interest for the sensitivity.

The determined sensitivity can be a current sensitivity of the ultrasonic sensor. In other words, the determined sensitivity can be a sensitivity of the ultrasonic sensor at a given point in time and at a given (for example current) membrane temperature.

The prestored sensitivity may be a sensitivity of the ultrasonic sensor which is predetermined or prestored, for example in the storage unit or in a different storage device. The prestored sensitivity can be a target sensitivity. The target sensitivity is preferably the same for several or all signal paths, in particular for multiple or all ultrasonic sensors of a same type. Having a same target sensitivity for multiple signal paths and/or ultrasonic sensors is advantageous because all these sensors will output a same signal when detecting a same object at a same distance. An analysis of signals output by multiple ultrasonic sensors is then facilitated.

The electric current can be modified by a control unit which changes the electric current to the exciter element as a function of the difference between the determined sensitivity and the prestored sensitivity. The electric current provided to the exciter element can be indicative of how the exciter element excites the membrane. The ultrasonic signal output by the ultrasonic sensor can vary as the electric current varies. Varying the electric current can modify the output of the ultrasonic sensor and hence the sensitivity thereof. Preferably, the electric current is adjusted such as to compensate for the difference between the determined sensitivity and the prestored sensitivity. In particular, the difference between the determined sensitivity and the prestored sensitivity is reduced in the step of controlling the electric current. The step of "controlling an electric current" preferably includes a modification (adjustment) of the electric current.

For example, the larger the difference between the determined sensitivity and the prestored sensitivity, the larger the modification of the electric current in the "controlling" step. Preferably, the amount by which the electric current is adjusted is proportional to the difference between the determined sensitivity and the prestored sensitivity. The amount by which the electric current is adjusted can be provided by a model stored as a table, graph or the like. In particular, the model may indicate that a gain of X decibels (corresponding to a given variation in the sensitivity) can be achieved by a variation of Y amperes.

In the case of an arrangement with multiple ultrasonic sensors, modifying the electric current provided to the exciter element of a first ultrasonic sensor modifies the signals received by any ultrasonic sensor from the first ultrasonic sensor. Thus, the modification of the electric current does not allow adjusting the sensitivity of an individual signal path but only of multiple signal paths (one signal path corresponding to the path from a transmitter to a receiver). Modifying the electric current usually allows a rough adjustment of the sensitivity.

The gain is in particular a digital gain. Modifying the gain can correspond to multiplying the output signal of the ultrasonic sensor, namely the amplitude of the received signal, by a predefined constant. The (digital) gain of the ultrasonic sensor, in particular of an individual signal path, can be adjusted directly by a gain adjusting part in the control unit (which can be an ASIC). The ultrasonic signal output by the ultrasonic sensor can vary as the gain is varied. Varying the gain can modify the output of the ultrasonic sensor and hence the sensitivity thereof. Preferably, the gain is adjusted such as to compensate for the difference between the determined sensitivity and the prestored sensitivity. In particular, the difference between the determined sensitivity and the prestored sensitivity is reduced in the step of controlling the gain. The step of "controlling a gain" preferably includes a modification (adjustment) of the gain.

For example, the larger the difference between the determined sensitivity and the prestored sensitivity, the larger the modification of the gain in the "controlling" step. Preferably, the amount by which the gain is adjusted is proportional to the difference between the determined sensitivity and the prestored sensitivity. The amount by which the gain is adjusted can be provided by a model stored as a table, graph or the like. In particular, the model may indicate that a sensitivity change of M Hertz can be achieved by a variation of N decibels.

The gain can be modified for each signal path individually. As a result, the gain adjustment allows a fine tuning of the sensitivity for each ultrasonic sensor, in particular for each signal path.

With only the gain adjustment, any sensitivity of the ultrasonic sensor can be achieved. However, modifying the gain by a large amount (for example by more than 3 dB) can negatively increase the noise. Compensating for the difference between the determined sensitivity and the prestored sensitivity using both the electric current and the gain allows adjusting the sensitivity by a sufficient amount (with the electric current adjustment) and with sufficient accuracy (using the gain adjustment), while keeping the noise low. When the step of controlling includes both controlling the electric current and controlling the gain, controlling the electric current is preferably performed prior to controlling the gain.

According to an embodiment, the electric current provided to the exciter element and/or the gain of the ultrasonic sensor are controlled such as to compensate for the difference between the determined sensitivity and the prestored sensitivity.

In particular, the electric current provided to the exciter element and/or the gain of the ultrasonic sensor are controlled such that if the first and second frequency responses were remeasured after adjusting the electric current provided to the exciter element and/or the gain of the ultrasonic sensor, a new determined sensitivity determined based on the new measurements of the first and second frequency responses would be closer to the prestored sensitivity than the determined sensitivity determined prior to the adjustment of the electric current provided to the exciter element and/or the gain of the ultrasonic sensor.

According to another embodiment, the method further includes controlling the membrane excitation frequency and/or a detection frequency region in which the ultrasonic sensor is set to detect the vibrations of the membrane based on the obtained calibration data and the determined current membrane temperature.

Thereby, the temperature dependency of the transfer function in a sending direction and/or the temperature dependency of the transfer function in a receiving direction can be respectively compensated in a frequency-dependent manner. Advantageously, the temperature dependency of the membrane excitation frequency and/or of the detection frequency region can respectively be compensated.

The step of controlling the membrane excitation frequency and/or the detection frequency is preferably part of a calibration process of the ultrasonic sensor, which is performed prior to using the ultrasonic sensor in an operation process thereof.

The membrane excitation frequency can be the frequency at which the exciter element excites the membrane to send out the ultrasonic signal.

Controlling the membrane excitation frequency can correspond to controlling and/or varying the excitation frequency at which the exciter element excites the membrane. The membrane excitation frequency is preferably controlled such that the sensitivity of the ultrasonic sensor is maximized in the sending direction for the current membrane temperature. In particular, the membrane excitation frequency is modified to match the excitation frequency for which the first frequency response is highest for the current temperature. The operation of the ultrasonic sensor in the sending direction is thereby improved, in particular optimized.

The detection frequency region can be the region in which the ultrasonic sensor is currently set to detect the received echo signal. In particular, the exciter element may convert the signal received at the membrane into an electric signal. The exciter element may include a filter which only selects signals in the particular detection frequency region.

Controlling the detection frequency region can correspond to controlling and/or varying the detection frequency range at which the exciter element currently detects the signal. The detection frequency range is preferably controlled such that the sensitivity of the ultrasonic sensor is maximized in the receiving direction for the current membrane temperature. In particular, the detection frequency range is modified to include and/or match the excitation frequency for which the second frequency response is highest for the determined current temperature. The operation of the ultrasonic sensor in the receiving direction is thereby improved, in particular optimized.

According to another embodiment, determining the determined sensitivity includes calculating an integral of a difference between the first frequency response at the current membrane temperature and the second frequency response at the current membrane temperature multiplied by a frequency dependent weighting factor, the integral being performed over a frequency bandwidth of interest.

In other words, the sensitivity is calculated by performing the following integral: $\int [FR1(f)-FR2(f)]*h(f)df$, wherein f is the frequency, FR1(f) is the frequency dependent first frequency response, FR2(f) is the frequency dependent second frequency response and h(f) is the frequency dependent weighting factor. The weighting factor is precalculated for the bandwidth of interest. For example, the bandwidth of interest corresponds to a low chirp (44-50 kHz) or a high chirp (52-58 kHz) of the ultrasonic sensor. The weighting factor may be different for different bandwidths of interest.

According to another embodiment, the first frequency response of the ultrasonic sensor is a first frequency response of the ultrasonic sensor in a sending direction for a predetermined signal path, the second frequency response of the ultrasonic sensor is a second frequency response of the ultrasonic sensor in a receiving direction for the predetermined signal path, and determining a sensitivity of the ultrasonic sensor corresponds to determining the sensitivity of the predetermined signal path.

One signal path in particular corresponds to the path from a transmitter to a receiver (within a same ultrasonic sensor or between a transmitter and a receiver from different ultrasonic sensors). The membrane sending an ultrasonic signal may form a transmitter. The membrane receiving an ultrasonic signal may form a receiver.

According to another embodiment, the method further comprises:

empirically determining the calibration data by measuring the frequency response of the ultrasonic sensor in a sending direction while varying the membrane excitation frequency and performing these measurements at different membrane temperatures, and/or by measuring a second frequency response of the ultrasonic sensor in a receiving direction while varying the membrane vibration frequency and performing these measurements at different membrane temperatures.

In order to determine the frequency response in the sending direction, a measurement microphone placed at a predetermined distance from the ultrasonic sensor can be used. The microphone can detect the intensity of the ultrasonic signal emitted by the membrane in the sending direction. The microphone detects the ultrasonic signal intensity while the excitation frequency of the membrane is varied over a predefined frequency range, in particular continuously or in increments. Such a frequency sweep or variation can be repeated at different temperatures, for example using a climate chamber. The detected ultrasonic signal intensity at the different frequencies and temperatures can correspond to the first frequency response or be used to determine the first frequency response.

In order to determine the frequency response in the receiving direction, a loudspeaker placed at a predetermined distance from the ultrasonic sensor can be used. The loudspeaker can emit a reference ultrasonic signal, which simulates an echo, and which is received by the membrane in the receiving direction. The exciter element detects the ultrasonic signal intensity detected at the membrane while the frequency of the reference ultrasonic signal emitted by the loudspeaker is varied over a predefined frequency range, in particular continuously. Such a frequency sweep can be repeated at different temperatures, for example using a climate chamber. The detected ultrasonic intensity at the different frequencies and temperatures can correspond to the second frequency response or be used to determine the second frequency response.

According to a further embodiment, the membrane excitation frequency and/or the membrane vibration frequency is varied between 10 KHz and 100 kHz, in particular between 40 and 70 kHz, in particular between 42 and 62 kHz during the empirical determination of the calibration data.

The membrane excitation frequency and/or the membrane vibration frequency may be varied in a continuous manner, in particular by performing frequency sweeps. Alternatively, the frequency response may be measured only for discrete values of the membrane excitation frequency and/or the membrane vibration frequency, for example in 1, 2 or 5 kHz increments. The calibration data may include information about the first frequency response and/or second frequency response for various membrane excitation frequencies and/or membrane vibration frequencies, in particular between 40 and 70 kHz, more particularly between 42 and 62 kHz.

According to a further embodiment, the calibration data includes information about the first frequency response and/or second frequency response for various temperatures between −40° C. and 90° C. or between −30° and 80° C., in particular in 5° C. or 10° ° C. increments.

During the empirical determination of the calibration data, the above-described frequency response measurements may be performed for different temperatures in the above ranges and increments.

According to a further embodiment, the steps of determining a current temperature of the membrane and of controlling the electric current provided to the exciter element, the gain of the ultrasonic sensor, the membrane excitation frequency and/or the detection frequency region are performed multiple times during an operation phase of the ultrasonic sensor, in particular on a same ultrasonic sensor.

The operation phase can be a period during which the ultrasonic sensor is used to determine a distance to an object, in particular without being shut-off. In detail, the ultrasonic sensor can be re-calibrated as the membrane temperature changes to maintain a good sensor sensitivity. The same calibration data can be used for each of the calibrations, thereby reducing a calibration effort.

According to a further embodiment, the steps of determining a current temperature of the membrane and of controlling the electric current provided to the exciter element, the gain of the ultrasonic sensor, the membrane excitation frequency and/or the detection frequency region are performed at regular time intervals during the operation phase of the ultrasonic sensor, in particular every one, two, five or ten minutes.

They can also be performed twice and hour, every hour or the like. Performing the steps of determining a current temperature of the membrane, of controlling the electric current provided to the exciter element, the gain of the ultrasonic sensor, the membrane excitation frequency and/or the detection frequency region are performed at regular intervals is advantageous in that the calibration of the ultrasonic sensor can be adjusted as the current temperature varies. This allows maintaining a high sensitivity of the ultrasonic sensor.

According to a further embodiment, the calibration data is stored as a table in the storage unit.

Storing the calibration data as a table is convenient as it requires little storage space.

According to a further embodiment, the first frequency response includes a ratio of a frequency response of the ultrasonic sensor in the sending direction at a predetermined membrane temperature to a frequency response of the ultrasonic sensor in the sending direction at a room temperature for each of the different membrane temperatures; and/or the second frequency response includes a ratio of a frequency response of the ultrasonic sensor in the receiving direction at a predetermined membrane temperature to a frequency response of the ultrasonic sensor in the receiving direction at the room temperature for each of the different membrane temperatures.

Room temperature may designate a membrane temperature of 20° C.

According to a second aspect, a computer program product comprising instructions which, when the program is executed by a computer, cause the computer to carry out the method according to the first aspect or according to an embodiment of the first aspect is provided.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

According to a third aspect, an ultrasonic sensor system is provided. The ultrasonic sensor system comprises:

an ultrasonic sensor comprising a membrane and an exciter element for exciting the membrane and/or for detecting a vibration of the membrane;

a storage unit for storing calibration data, the calibration data comprising information about a first frequency response of the ultrasonic sensor in a sending direction depending on a membrane excitation frequency at different membrane temperatures and information about a second frequency response of the ultrasonic sensor in a receiving direction depending on a membrane vibration frequency at different membrane temperatures;

a temperature determination unit for determining a current temperature of the membrane;

a sensitivity determination unit for determining a sensitivity (determined sensitivity) of the ultrasonic sensor using the first frequency response at the current membrane temperature and the second frequency response at the current membrane temperature; and a control unit for controlling an electric current provided to the exciter element and/or a gain of the ultrasonic sensor based on a difference between the determined sensitivity and a prestored sensitivity.

The storage unit, temperature determination unit, sensitivity determination unit and/or control unit can be implemented as hardware and/or software. The temperature determination unit, sensitivity determination unit and/or control unit can be provided in a single ASIC (application-specific integrated chip). The ultrasonic sensor system may be configured to perform the method according to the first aspect or according to an embodiment of the first aspect. The embodiments and features described with reference to the method of the first aspect apply mutatis mutandis to the ultrasonic sensor system according to the third aspect.

According to a fourth aspect, a vehicle comprising the ultrasonic sensor system according to the third aspect for determining a distance to an obstacle (or object) is provided.

The embodiments and features described with reference to the ultrasonic sensor system of the third aspect apply mutatis mutandis to the vehicle according to the fourth aspect.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features and advantages of the present invention will become apparent from the subsequent description and dependent claims, taken in conjunction with the accompanying drawings, in which:

FIG. 9 shows an example of a table for adjusting an electric current provided to an exciter element and/or a gain of the ultrasonic sensor.

In the Figures, like reference numerals designate like or functionally equivalent elements, unless otherwise indicated.

Figure 1:
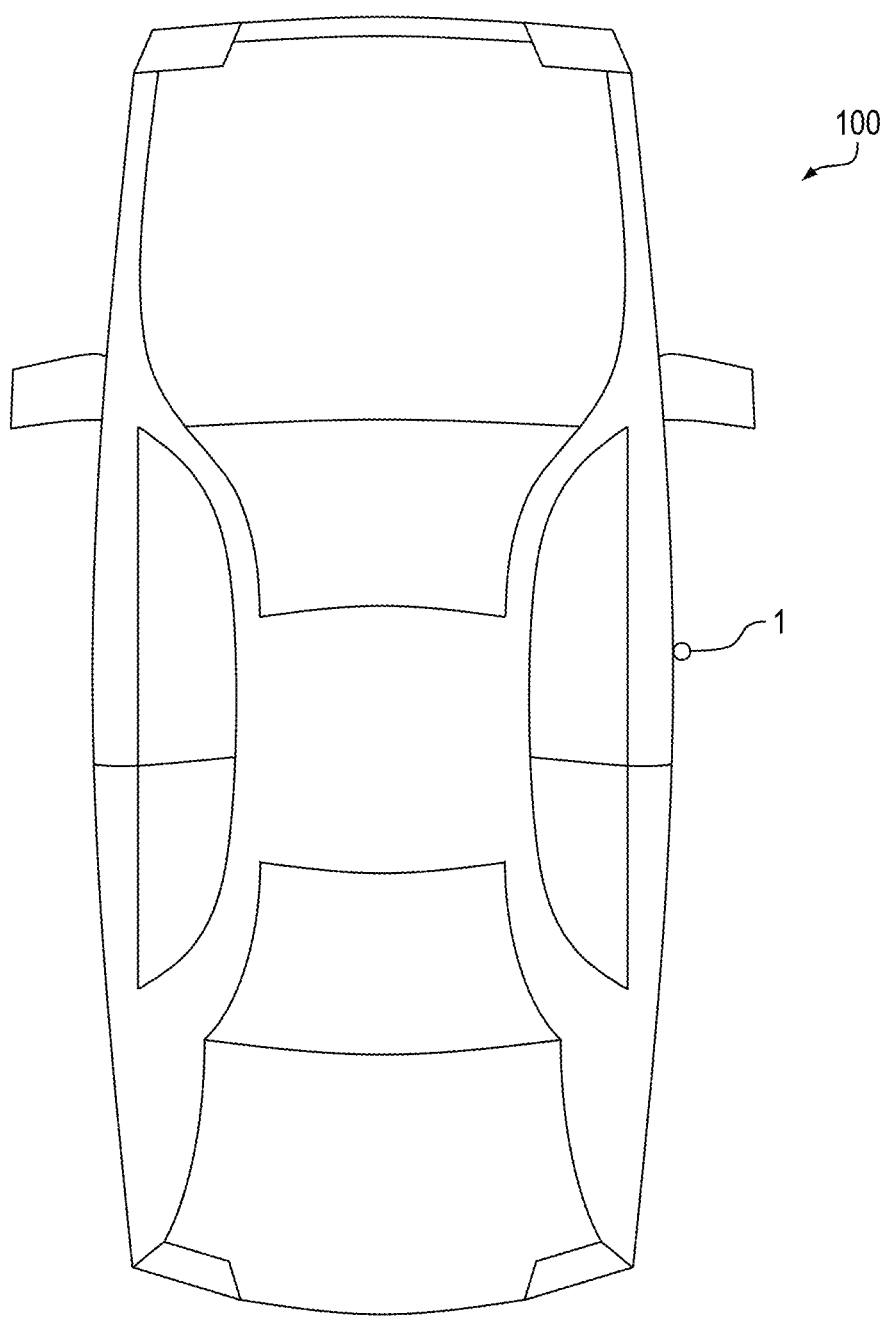
FIG. 1 shows a vehicle including an ultrasonic sensor system.

FIG. 1 shows a vehicle 100 including an ultrasonic sensor system 1. The vehicle 100 is a car. In the orientation of FIG. 1, the ultrasonic sensor system 1 is located on a right-hand side of the vehicle 100. The ultrasonic sensor system 1 is configured to determine a distance to an obstacle or object on the right side of the vehicle 100. Knowing a distance to such obstacles or objects is particularly useful to assist a driver in parking and/or when the vehicle 100 is driven partly or entirely autonomously.

Figure 2:
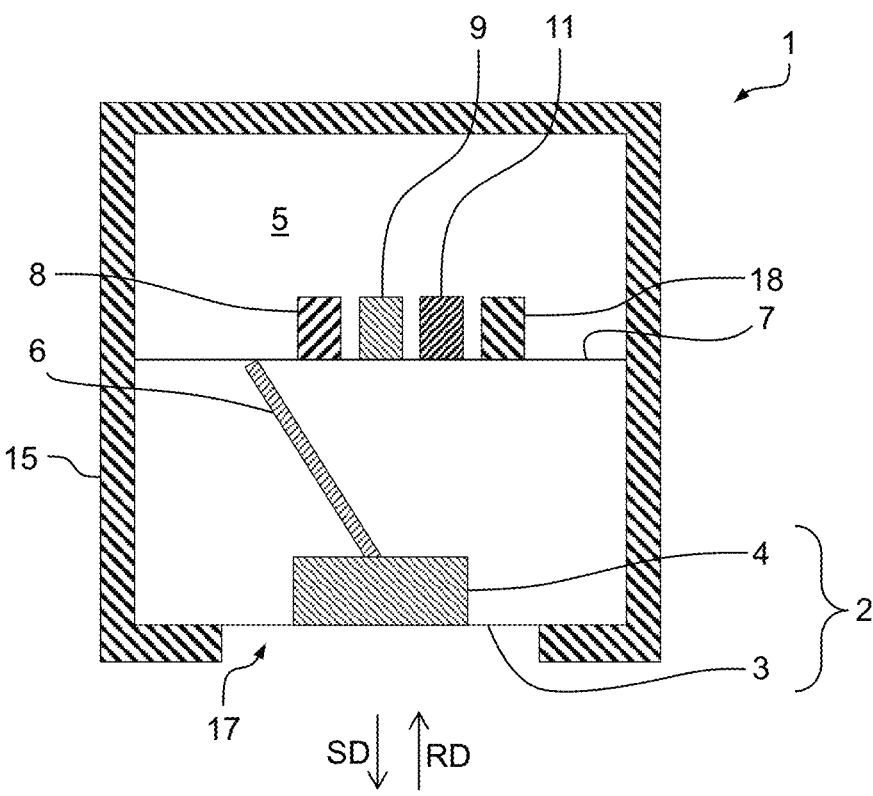
FIG. 2 shows the ultrasonic sensor system of FIG. 1.

The ultrasonic sensor system 1 is shown in more detail in FIG. 2. The ultrasonic sensor system 1 includes a housing 15 made of a plastic material. On one side of the ultrasonic sensor system 1 (on the lower side in the orientation of FIG. 2), the housing 15 includes an opening 17 in which an ultrasound membrane 3 is arranged. The membrane 3 is configured to send and receive ultrasound signals.

The membrane 3 has an exciter element 4, which is a piezo element, connected thereto. The exciter element 4 is configured to receive an electric signal with a particular electric current and to accordingly mechanically excite the membrane 3. Further, the exciter element 4 is configured to receive the vibrations from the membrane 3 and to convert them into an electric signal. The membrane 3 and the exciter element 4 form an ultrasonic sensor 2.

The ultrasonic sensor 2 uses a dual chirp wide band signal. In order to guarantee the signal amplitude is constant over the temperature of the membrane 3, the behavior of the transfer function over temperature must be properly modelled. This is explained in the following.

In an interior 5 of the ultrasonic sensor system 1, the ultrasonic sensor system 1 further includes a printed circuit board (PCB) 7 on which a control unit 8, a storage unit 9, a temperature determination unit 11 and a sensitivity determination unit 18 are arranged. The units 8, 9, 11, 18 can be embedded in an ASIC. The functionalities of these units 8, 9, 11, 18 will be described in the following. The PCB 7 is connected to the exciter element 4 through a contact element 6 to transmit electric signals thereto and/or receive electric signals therefrom. The contact element 6 is a wire in the example of FIG. 2.

The storage unit 9 is configured to store calibration data. The calibration data indicates how the ultrasonic sensor 2 responds to different membrane excitation frequencies at different temperatures in a sending direction SD and how the ultrasonic sensor 2 responds to different membrane vibration frequencies at different temperatures in a receiving direction RD. The content of the calibration data and its empirical determination is described in view of FIGS. 3 to 7.

Figure 3:
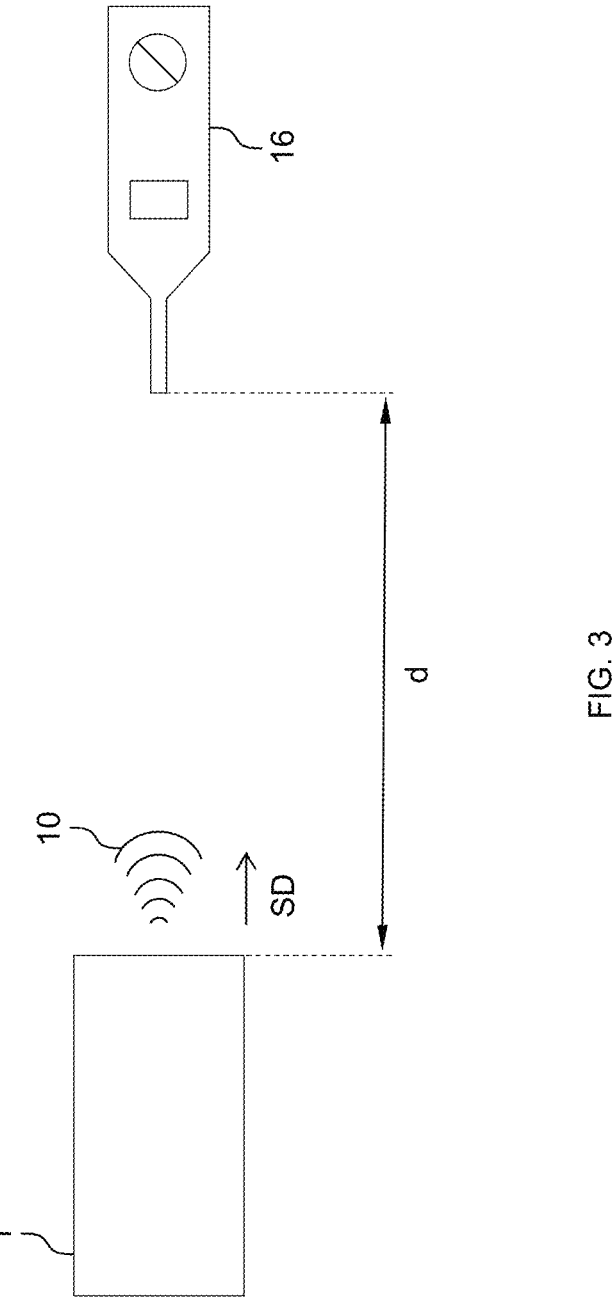
FIG. 3 shows an empirical determination of a frequency response in a sending direction.

FIG. 3 shows a setup to empirically determine a frequency response of the ultrasonic sensor 2 in a sending direction SD. This empirical determination is used to determine the first frequency response FR1 included in the calibration data, as will be described in the following. The first frequency response FR1 is frequency dependent.

As shown in FIG. 3, a microphone 16 is placed in front of the ultrasonic sensor system 1 at a distance d thereof. The microphone 16 is oriented such as to lie in a propagation path of an ultrasonic signal 10 emitted by the membrane 3 along the sending direction SD. The setup of FIG. 3 is placed in a climate chamber (not shown) for varying the temperature of the membrane 3.

The microphone 16 is used to determine the intensity of ultrasonic signal 10 reaching the microphone 16 (in units of decibels, for example) while the excitation frequency of the membrane 3 is varied by varying the electric signal to the exciter element 4. In other words, the frequency response FR of the ultrasonic sensor 2 in the sending direction SD is measured as a function of temperature and frequency. This measurement is repeated for each ultrasonic sensor 2 individually and at different temperatures (between −40° ° C. and 80° C. in the present example, in 20° C. increments). In the example of FIG. 3, the frequency is varied continuously between 42 and 62 kHz.

Figure 4:
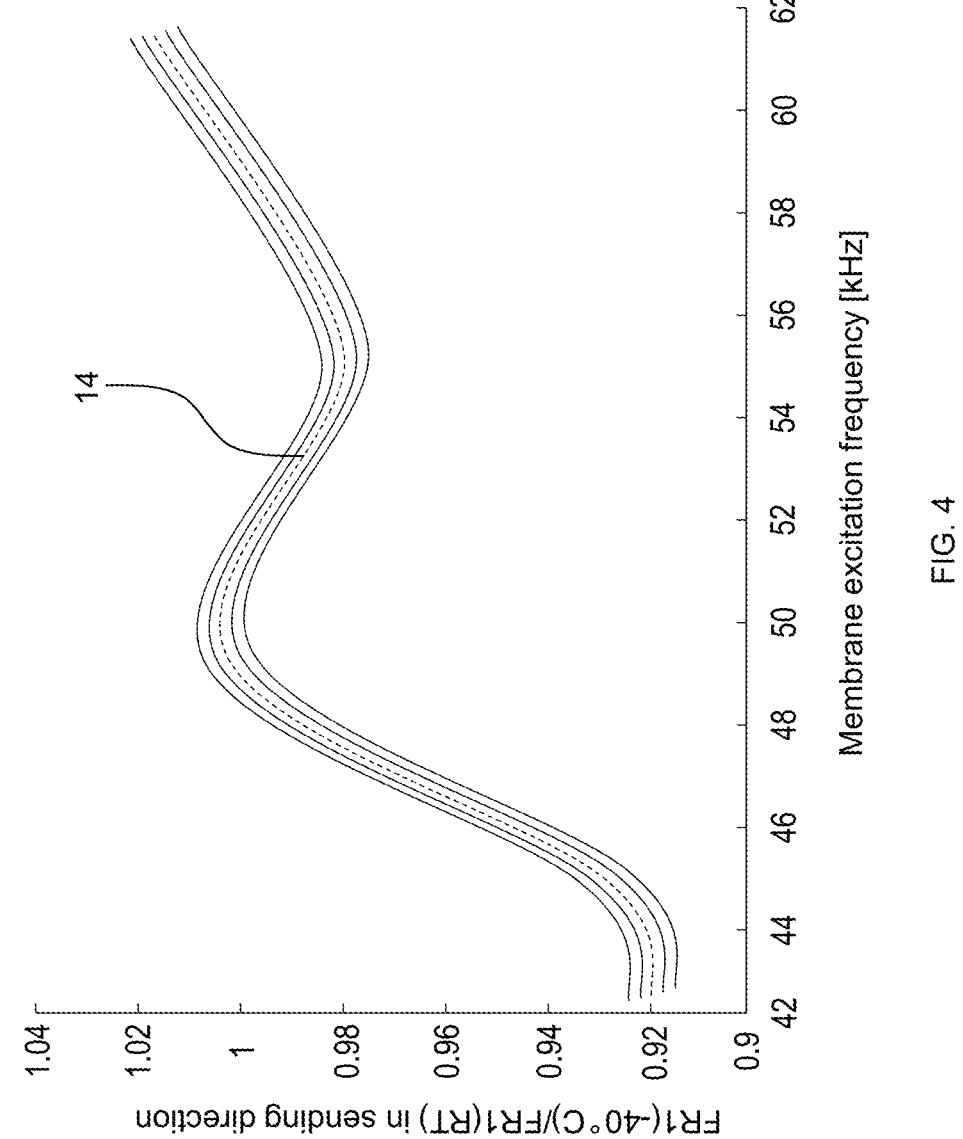
FIG. 4 shows a relationship between a ratio of a first frequency response at −40° C. to a first frequency response at room temperature depending on frequency.

As a result, a curve like the one shown in FIG. 4 is obtained for each discrete temperature value. FIG. 4 is the curve for −40° C. In detail, FIG. 4 shows how the ratio of the first frequency response FR1 at −40° C. (FR1(−40° C.)) to the first frequency response FR1 with the membrane 3 at room temperature RT (FR1(RT)), which is indicated on the vertical axis and is dimensionless, varies as the excitation frequency of the membrane 3, which is indicated on the horizontal axis and expressed in kHz, varies. "Room temperature" RT here designates a membrane temperature of 20° C.

In FIG. 4, the different curves represent four different measurements of FR1(−40° C.)/FR1(RT) as a function of the membrane excitation frequency. The dashed line indicates the median 14 of the curves.

Figure 5:
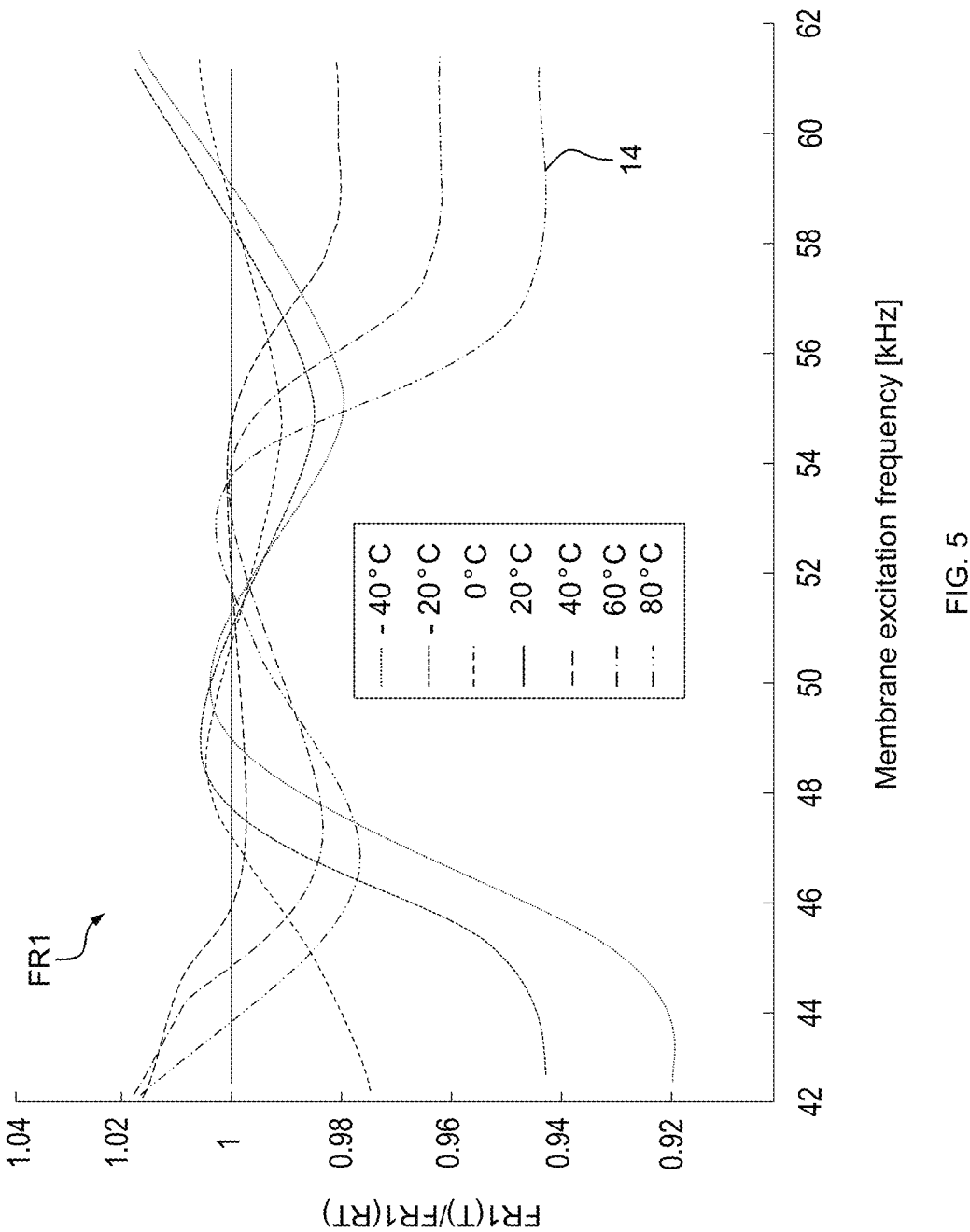
FIG. 5 shows an example of calibration data comprising information about a first frequency response.

FIG. 5 shows such medians 14 of FR1(T)/FR1(RT) for each of the discrete temperatures at which the measurements were performed. The graph shown in FIG. 5 is indicative of the first frequency response FR1 of the ultrasonic sensor 2 in the sending direction SD and is stored in the storage unit 9 as part of the calibration data.

Figure 6:
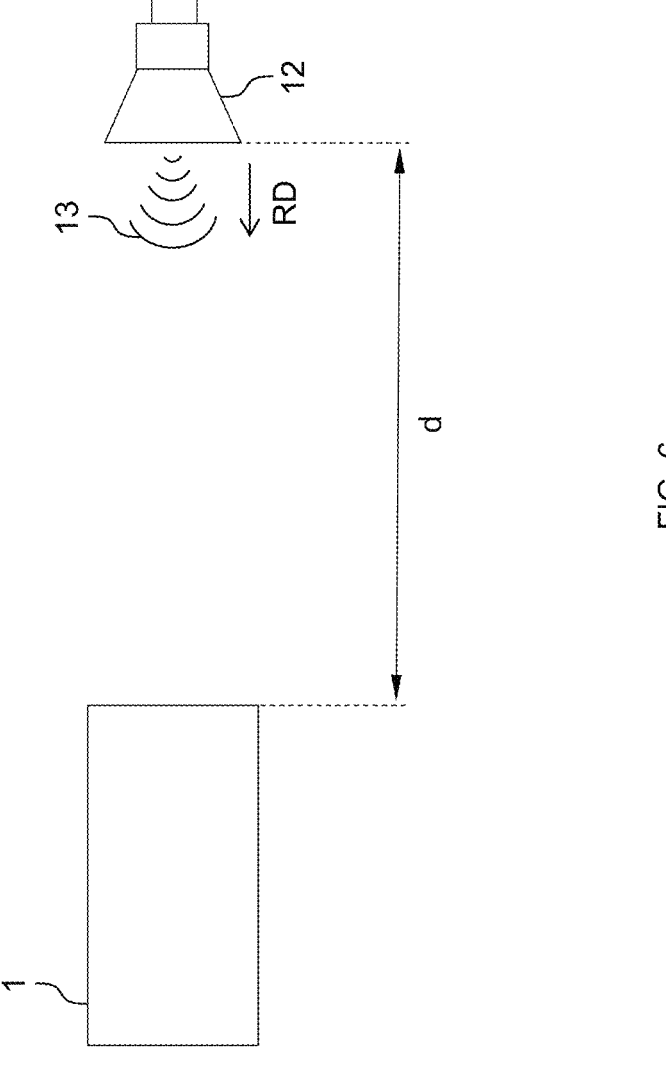
FIG. 6 shows an empirical determination of a frequency response in a receiving direction.

A similar empirical determination can be performed to determine the second frequency response FR2 in the receiving direction RD. For this, the empirical setup of FIG. 6 is used. As shown in FIG. 6, a loudspeaker 12 is placed in front of the ultrasonic sensor system 1 at a distance d thereof (the distance d can be equal or different to the distance d of FIG. 3). The loudspeaker 12 is oriented such that an ultrasonic reference signal 13 emitted by the loudspeaker 12 along the receiving direction RD reaches the membrane 3 of the ultrasonic sensor system 1. The setup of FIG. 3 is placed in a climate chamber (not shown) for varying the temperature of the membrane 3.

The electric signal emitted by the exciter element 4 in response to the vibration of the membrane 3 at receiving the reference signal 13 is analyzed to determine an intensity of the ultrasonic signal 13 reaching the exciter element 4 (in units of decibels, for example) while the frequency of the reference signal 13 is varied by the loudspeaker 12, thereby varying the membrane vibration frequency. In other words, the second frequency response FR2 of the ultrasonic sensor 2 in the receiving direction RD is measured as a function of temperature and frequency. This measurement is repeated for each individual ultrasonic sensor and at different temperatures (between −40° ° C. and 80° ° C. in the present example, in 20° ° C. increments). In the example of FIG. 6, the frequency is varied continuously between 42 and 62 kHz.

Figure 7:
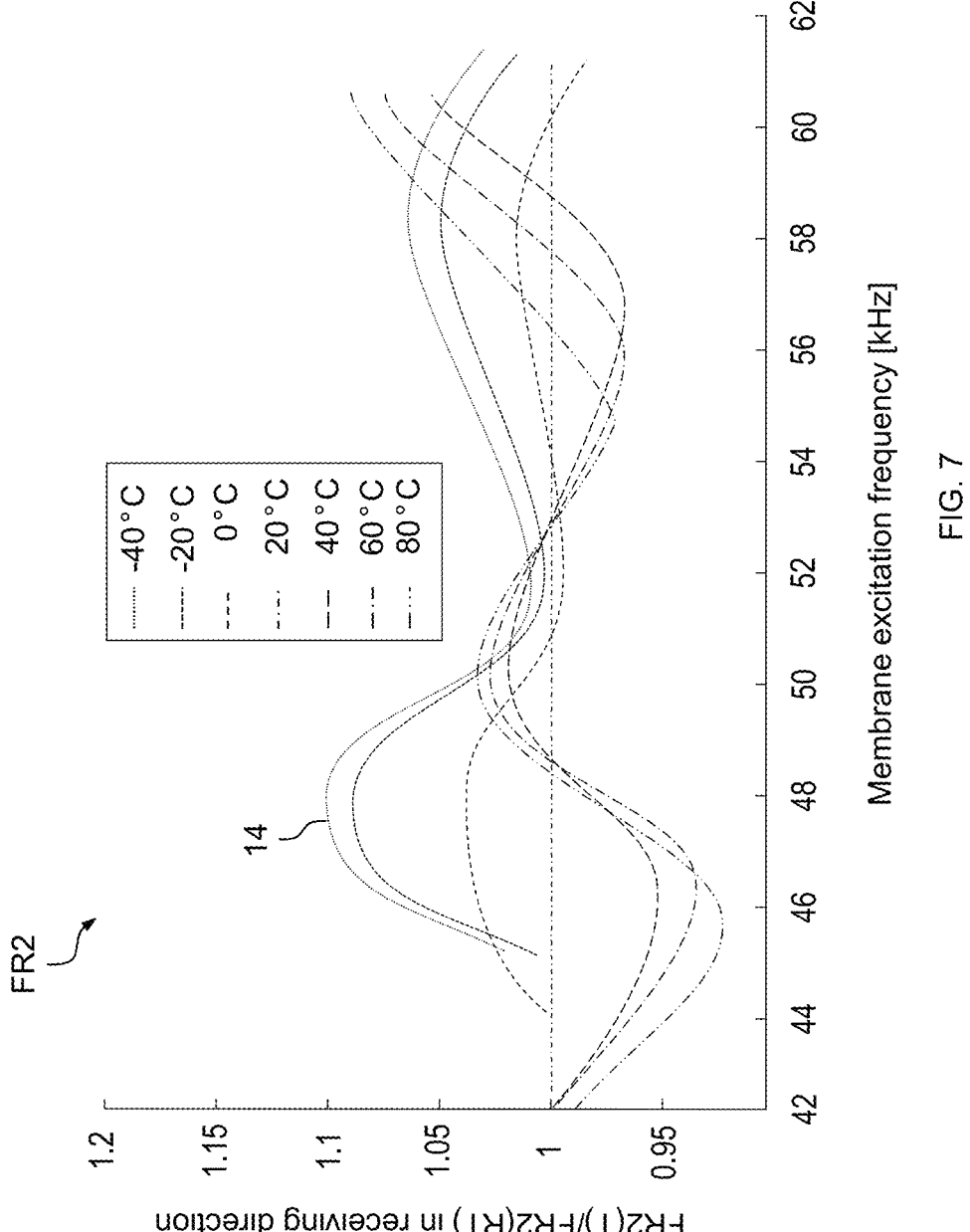
FIG. 7 shows an example of calibration data comprising information about a second frequency response.

Similarly to FIGS. 4 and 5, the result of the experiment of FIG. 6 is the second frequency response FR2 shown in FIG. 7, which is stored in the storage unit 9 as part of the calibration data. In detail, FIG. 7 shows medians 14 of the ratios of the second frequency response FR2 of the sensor 2 at one of the discrete temperatures in the receiving direction (FR2(T)) over the second frequency response FR2 at room temperature (20° C.) in the receiving direction (FR2(RT)) as a function of frequency.

The empirical determination of the first and second frequency responses FR1, FR2 is performed only once for each ultrasonic sensor 2 in order to determine its own calibration data. The stored calibration data can be directly used to calibrate the ultrasonic sensor 2 to improve its sensitivity at all times. The calibration of the ultrasonic sensor 2 using the ultrasonic sensor system 1 is described in the following with regards to FIG. 8.

Figure 8:
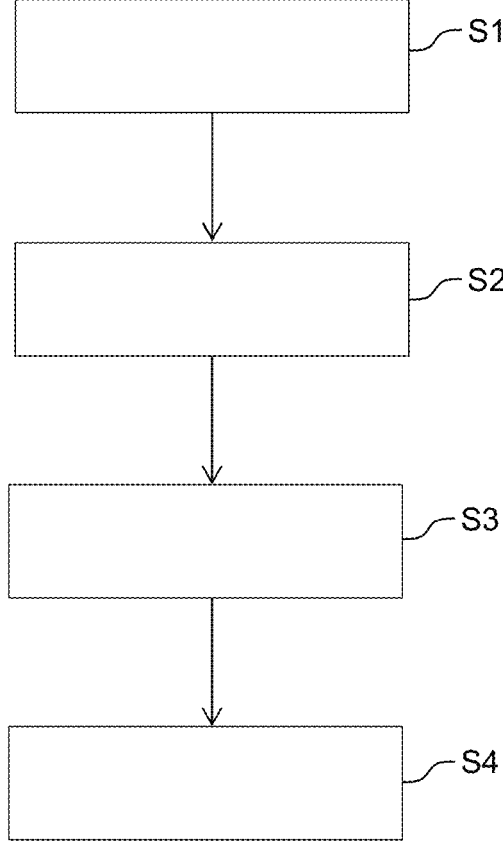
FIG. 8 shows a method for operating an ultrasonic sensor according to a first embodiment.

In detail, in a step S1 of FIG. 8, the calibration data is obtained from the storage unit 9. In particular, the control unit 8 retrieves the calibration data, which here includes the graphs from FIGS. 5 and 7.

In a step S2 of FIG. 8, which can be performed after, during or prior to step S1, the temperature determination unit 11 determines the current temperature of the membrane 3. This may be done mathematically and/or using a temperature sensor. The determined temperature of the membrane 3 is then sent to the control unit 8.

In a step S3, the sensitivity determination unit 18 calculates a determined sensitivity of the ultrasonic sensor 2 using the first frequency response FR1 at the current membrane temperature and the second frequency response FR2 at the current membrane temperature. In detail, the sensitivity determination unit 18 calculates an integral of a difference between the first frequency response FR1 at the current membrane temperature and the second frequency response FR2 at the current membrane temperature multiplied by a weighting factor, the integral being performed over a frequency bandwidth of interest, for example between 44 and 50 kHz (low channel chirp).

In other words, using the calibration data stored in FIGS. 5 and 7 at the current membrane temperature determined in step S2, the sensitivity determination unit 18 calculates the determined sensitivity as being $\int (FR1(f) - FR2(f))^* h(f) \, df$, with f being the frequency, FR1 (f) and FR2(f) corresponding to the first and second frequency responses FR1 and FR2 and explicitly indicating the frequency-dependences thereof, and h(f) being the weighting factor. The weighting factor is precalculated for the bandwidth of interest.

In a step S4, the control unit 8 calculates the sensitivity as being 900 Hz. The control unit 8 then adjusts an electric current provided to the exciter element 4 and/or a gain of the ultrasonic sensor 2 to compensate for the difference between the determined sensitivity from step S3 and the prestored sensitivity. In other words, the control unit 8 adjusts the electric current provided to the exciter element 4 and/or the gain of the ultrasonic sensor 2 to reduce the difference between the sensitivity of the ultrasonic sensor 2 and the prestored sensitivity.

If the determined sensitivity from step S3 is lower than the prestored sensitivity, the control unit 8 increases the electric current to the exciter element 4, leading to an increase in sensitivity. Similarly, if the determined sensitivity from step S3 is higher than the prestored sensitivity, the control unit 8 decreases the electric current to the exciter element 4, leading to a decrease in sensitivity.

For a more precise tuning of the sensitivity, the control unit 8 then adjusts (increases or reduces) the gain of each signal path of the ultrasonic sensor 2 individually by directly changing a setting of a gain adjusting unit provided in the control unit 8.

Accordingly, the sensitivity of the ultrasonic sensor 2 is adjusted to decrease the difference between the sensitivity of the ultrasonic sensor 2 and the prestored sensitivity, preferably until the sensitivity of the ultrasonic sensor 2 and the prestored sensitivity become equal to each other.

To adjust the electric current and/or the gain, the control unit 8 may refer to a table stored in the storage unit 9 and shown in FIG. 9. The table of FIG. 9 indicates the amount of modifications to the electric current and/or the gain to be performed by the control unit 8 depending on the determined sensitivity from step S3. In the example of FIG. 9, the target sensitivity (prestored sensitivity) is 1000 Hz (1 kHz).

The table of FIG. 9 indicates, for each determined sensitivity value determined at step S3 (left column of FIG. 9), the amount of electric current modification and/or the amount of gain modification that the control unit 8 should perform to achieve the target sensitivity.

The table of FIG. 9 is determined in advance by observing how the modification of the electric current provided to the exciter element 4 and/or the modification of the gain modifies the first and second frequency responses FR1 and FR2 and hence the sensitivity of the ultrasonic sensor 2.

In the above example in which the control unit 8 determines that the sensitivity is 900 Hz in step S3, the electric current is adjusted by increasing the current by 0 (zero) mA and the gain is adjusted by adding 1 dB to achieve the target sensitivity of 1000 Hz.

Figure 10:
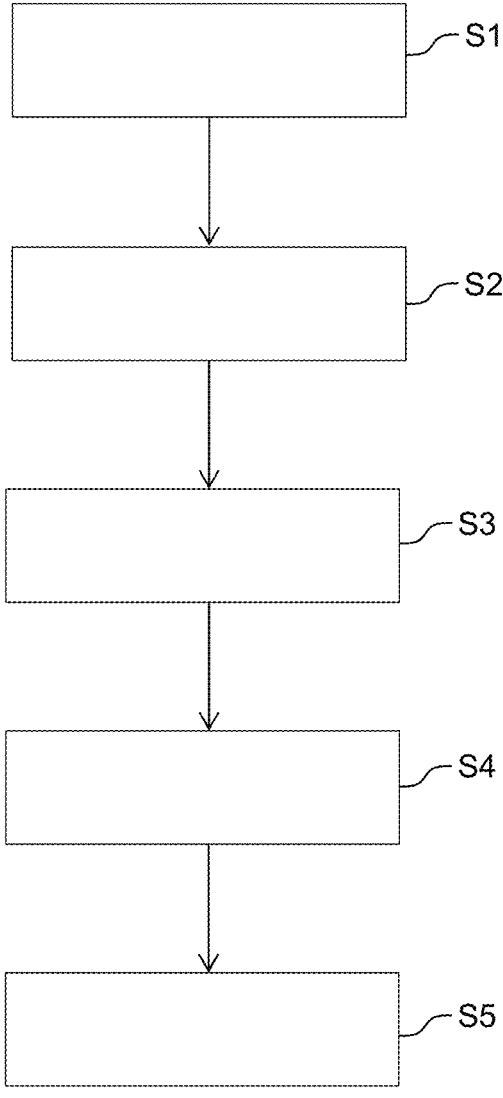
FIG. 10 shows a method for operating an ultrasonic sensor according to a second embodiment.

FIG. 10 shows a further embodiment of a method for operating an ultrasonic sensor 2, which can be performed with the ultrasonic sensor 2. The steps S1-S4 are identical with the steps S1-S4 described in view of FIG. 8.

In a step S5, the control unit 8 uses the membrane temperature obtained from the temperature determination unit 11 and the calibration data received from the storage unit 9 to control the ultrasonic sensor 2. In detail, the control unit 8 controls the excitation frequency of the membrane 3 such that it matches the frequency for which the first frequency response FR1 (FIG. 5) is highest at the determined temperature of the membrane 3. Thereby, a high sensitivity of the ultrasonic sensor 2 is achieved in the sending direction SD.

Further, the control unit 8 controls the detection frequency region of the ultrasonic device 2 such that it matches or includes the frequency for which the second frequency response FR2 (FIG. 5) is highest at the determined temperature of the membrane 3. Thereby, a high sensitivity of the ultrasonic sensor 2 is achieved in the receiving direction RD.

Although the present invention has been described in accordance with preferred embodiments, it is obvious for the person skilled in the art that modifications are possible in all embodiments. For example, instead of storing the first and second frequency responses FR1, FR2 as graphs, they can be stored as tables, for example only including the highest frequency response for each temperature, in the calibration data. The empirical determination of the first and second frequency responses FR1, FR2 can be performed with more or less different ultrasonic sensors 2, over a different frequency and/or temperature range and/or in different frequency and/or temperature increments.

REFERENCE NUMERALS 1 ultrasonic sensor system
2 ultrasonic sensor
3 membrane
4 exciter element
interior
6 contact element
7 printed circuit board
8 control unit
9 storage unit
ultrasonic signal

14

11 temperature determination unit
12 loudspeaker
13 reference signal
14 median
housing
16 microphone
17 opening
18 sensitivity determination unit
100 vehicle
d distance
FR1 first frequency response
FR2 second frequency response
RD receiving direction
RT room temperature
SD sending direction
S1-S5 method steps

The invention claimed is:

1. A method for operating an ultrasonic sensor,
the ultrasonic sensor comprising a membrane and an exciter element for exciting the membrane and for detecting a vibration of the membrane;
the method comprising:
    obtaining calibration data from a storage unit that stores the calibration data,
    wherein the calibration data comprises information about a first frequency response of the ultrasonic sensor in a sending direction depending on a membrane excitation frequency at different membrane temperatures, and information about a second frequency response of the ultrasonic sensor in a receiving direction depending on a membrane vibration frequency at different membrane temperatures;
    determining a current membrane temperature;
    determining a sensitivity of the ultrasonic sensor using the first frequency response at the current membrane temperature and the second frequency response at the current membrane temperature; and
    controlling an electric current provided to the exciter element and a gain of the ultrasonic sensor based on a difference between the determined sensitivity and a prestored sensitivity.

2. The method according to claim 1,
wherein the electric current provided to the exciter element and the gain of the ultrasonic sensor are controlled such as to compensate for the difference between the determined sensitivity and the prestored sensitivity.

3. The method according to claim 1,
further comprising:
    controlling the membrane excitation frequency and a detection frequency region in which the ultrasonic sensor is set to detect the vibrations of the membrane based on the obtained calibration data and the determined current membrane temperature.

4. The method according to claim 1,
wherein determining the determined sensitivity includes calculating an integral of a difference between the first frequency response at the current membrane temperature and the second frequency response at the current membrane temperature multiplied by a frequency dependent weighting factor,
wherein the integral is performed over a frequency bandwidth of interest.

5. The method according to claim 1, wherein the first frequency response of the ultrasonic sensor is a first frequency response of the ultrasonic sensor in a sending direction for a predetermined signal path, wherein the second frequency response of the ultrasonic sensor is a second frequency response of the ultrasonic sensor in a receiving direction for the predetermined signal path, and wherein determining a sensitivity of the ultrasonic sensor corresponds to determining the sensitivity of the predetermined signal path.

6. The method according to claim 1, further comprising:

empirically determining the calibration data by measuring the first frequency response of the ultrasonic sensor in a sending direction while varying the membrane excitation frequency and performing these measurements at different membrane temperatures, and by measuring the second frequency response of the ultrasonic sensor in a receiving direction while varying the membrane vibration frequency and performing these measurements at different membrane temperatures.

7. The method according to claim 6, wherein the membrane excitation frequency and the membrane vibration frequency are varied between 40 and 70 kHz during the empirical determination of the calibration data.

8. The method according to claim 1, wherein the calibration data includes information about the first frequency response and second frequency response for various temperatures between-40° C. and 90° C. in 10° C. increments.

9. The method according to claim 1, wherein the steps of determining a current membrane temperature and of controlling the current output by the exciter element, the gain of the ultrasonic sensor, the membrane excitation frequency and the detection frequency region are performed multiple times during an operation phase of the ultrasonic sensor.

10. The method according to claim 9, wherein the steps of determining a membrane temperature and of controlling the current output by the exciter element, the gain of the ultrasonic, the membrane excitation frequency and the detection frequency region are performed at regular time intervals during the operation phase of the ultrasonic sensor.

11. The method according to claim 1, wherein the calibration data is stored as a table in the storage unit.

12. The method according to claim 1, wherein the first frequency response includes a ratio of a frequency response of the ultrasonic sensor in the sending direction at a predetermined membrane temperature to a frequency response of the ultrasonic sensor in the sending direction at a room temperature for each of the different membrane temperatures; and wherein the second frequency response includes a ratio of a frequency response of the ultrasonic sensor in the receiving direction at a predetermined membrane temperature to a frequency response of the ultrasonic sensor in the receiving direction at the room temperature for each of the different membrane temperatures.

13. A non-transitory computer readable medium containing program instructions for causing a processor to perform the method of claim 1.

14. An ultrasonic sensor system comprising:

an ultrasonic sensor comprising a membrane and an exciter element for exciting the membrane and for detecting a vibration of the membrane;

a storage unit for storing calibration data, wherein the calibration data comprises information about a first frequency response of the ultrasonic sensor in a sending direction depending on a membrane excitation frequency at different membrane temperatures and information about a second frequency response of the ultrasonic sensor in a receiving direction depending on a membrane vibration frequency at different membrane temperatures;

a temperature determination unit for determining a current membrane temperature; a sensitivity determination unit for determining a sensitivity of the ultrasonic sensor using the first frequency response at the current membrane temperature and the second frequency response at the current membrane temperature; and a control unit for controlling an electric current provided to the exciter element and a gain of the ultrasonic sensor based on a difference between the determined sensitivity and a prestored sensitivity.

15. A vehicle comprising the ultrasonic sensor system according to claim 14 for determining a distance to an obstacle.

* * * * *